INVENTORS
RENÉ BARDE; RENÉ BUVET,
NICOLE BUSSON; JACQUES DUBOIS;
JACQUES MILLET; AND SOLANGE PALOUS
BY
*Woodhams, Blanchard and Flynn*
ATTORNEYS

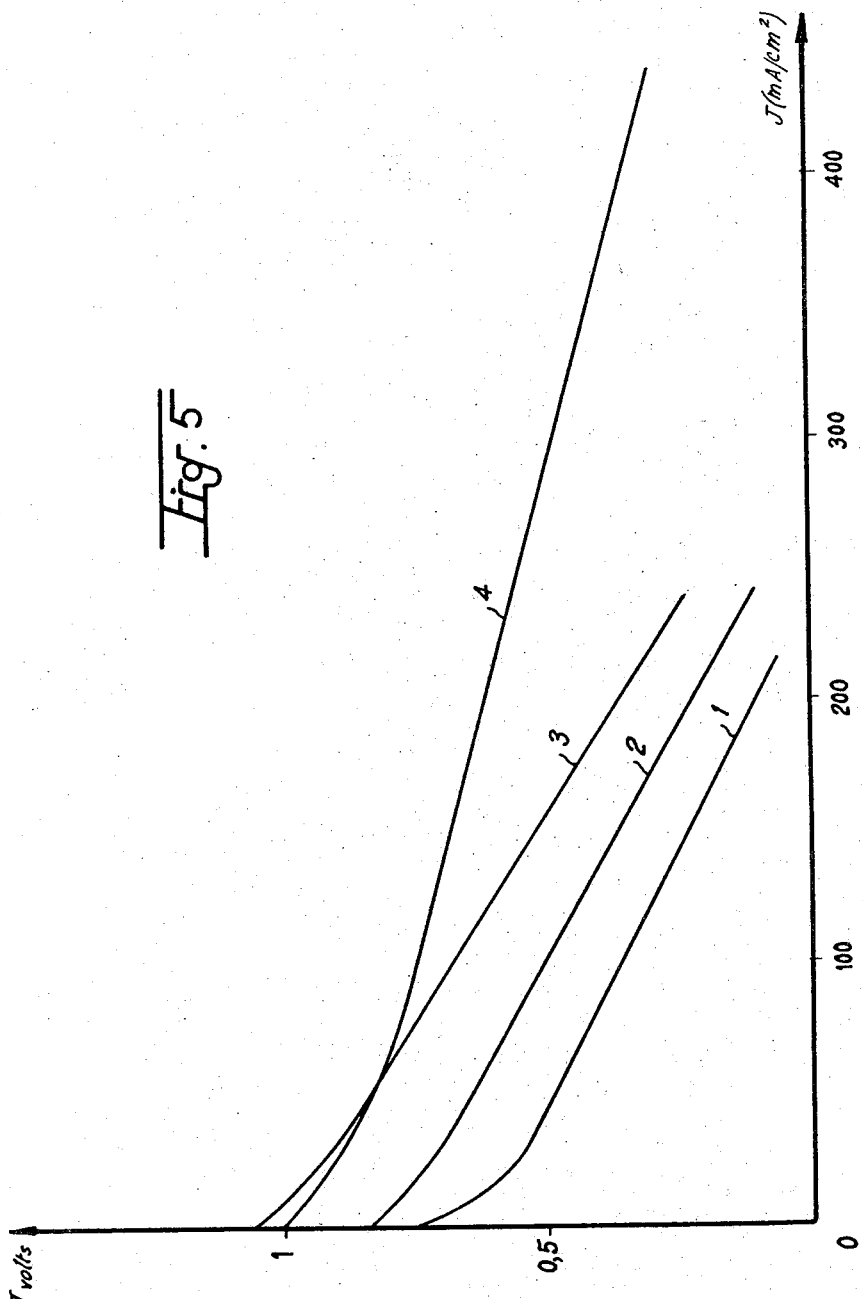

United States Patent Office 3,403,056
Patented Sept. 24, 1968

3,403,056
METHOD OF OPERATING A FUSED ALKALI CARBONATE FUEL CELL
René Barde, Villeneuve-Saint-Georges, René Buvet, Cachan, Jacques Millet and Jacques Dubois, Paris, Solange Palous, Clamart, and Nicole Busson, Antony, France, assignors to Electricite de France-Service National, Paris, France, a corporation of France
Filed June 24, 1965, Ser. No. 466,694
Claims priority, application France, Oct. 1, 1964, 990,071; Feb. 19, 1965, 6,279 (addition)
3 Claims. (Cl. 136—86)

ABSTRACT OF THE DISCLOSURE

A method of operating a fuel cell using an electrolyte consisting of at least one fused alkali carbonate into which is placed a pair of electrodes and in which an oxidant is supplied to one electrode and a fuel is supplied to the other electrode, in which there is added to the fused electrolyte from outside the fuel cell at the beginning of the operation thereof a member selected from the group consisting of (1) alkali oxides, (2) alkali hydroxides, (3) a mixture of an alkali oxide and a compound selected from the group consisting of weak acids and alkali salts of weak acids, and (4) water, the member being distributed substantially uniformly throughout the electrolyte and the concentration thereof being maintained at a suitable level throughout the operation of the cell in order to minimize polarization by maintaining the acidity potential of the electrolyte substantially uniform throughout the entire volume thereof.

---

It is well known that the properties of a combustion cell which operates at high temperature by means of an electrolyte consisting of fused alkali carbonate whether in the pure state or in a eutectic mixture are considerably improved by the injection of $CO_2$ combined with the combustion-supporting gas or oxidant, whether oxygen or air, which is employed at the oxidizing electrode. This knowledge results from the empiric test observations made on actual combustion cells (Thesis by G.H.J. Broers, Amsterdam University, 1958).

The reasons for this improvement can largely be verified from the considerations which are set forth hereunder and which must not in any event be interpreted as limiting the scope of this invention.

In the light of recently acquired knowledge, it can be considered that the improved performances of a carbonate cell which are brought about by the injection of $CO_2$ with the combustion-supporting gas correspond to the process which is set forth hereunder.

In a carbonate cell which operates without injection of $CO_2$ or any additions to the electrolyte, the combustible electrode and oxidizing electrode respectively are maintained at different acidity potentials as a result of the reactions which take place at said electrodes and of the inadequate velocities at which the species formed are transferred by diffusion-convection processes within the electrolyte. There are formed at the combustible electrode species having high acid concentrations of the type $C^{4+}$ and $H^+$; this electrode is therefore maintained at the acid end of the acidity range of the electrolyte employed. On the other hand, $O^{2-}$ ions having strongly basic properties are introduced in the electrolyte at the oxygen electrode. Consequently, the electrolyte which is located in the immediate vicinity of said electrode is maintained at the basic end of its acidity range.

In point of fact, the oxidation-reduction properties both of the combustibles and of the oxidants which are employed depend precisely on the acidity potential of the electrolyte which is in immediate contact with the electrode. The oxidation reduction potential of the combustible as well as that of the oxidant decreases when the acidity potential of the electrolyte which is in contact with the electrode increases. Consequently, when the cell operates with two electrodes in the vicinity of which the electrolytes are at the acidity potentials mentioned in the previous paragraphs in connection with the operation of a carbonate cell, the output voltage is accordingly restored to the theoretical value which corresponds to the combustion within the cell at a uniform acidity potential as reduced by a potential difference corresponding to the product of the acidity range of the electrolyte and of a factor which depends on the temperature and number of electrons which are exchanged in the oxidation-reduction reactions of the cell.

The invention will be further described with reference to the accompanying drawings, in which:

FIGURE 5 is a graph similar to FIGURE 4 and showing the curves for two additional electrolyte compositions.

Figure 1:
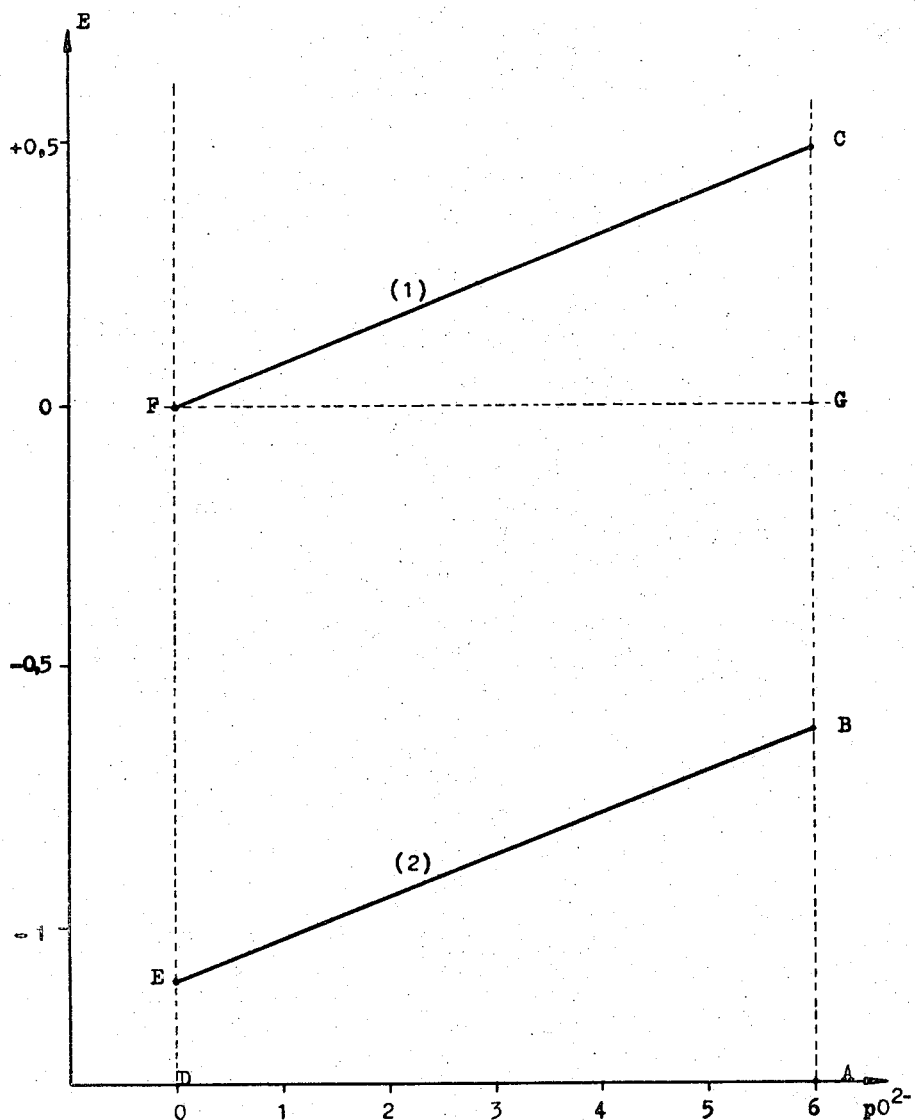
FIGURE 1 is a graph illustrating the variation in the oxidation-reduction potential of a fuel cell as a function of the acidity potential of a fused carbonate electrolyte.

FIGURE 1 defines these principles. This figure represents the variation in the oxidation-reduction potential at 560° C. respectively of the oxygen and of the hydrogen in the ternary eutectic mixture of fused alkali carbonates of Li, K and Na as a function of the acidity potential of these latter. The acidity potential referred to is expressed by the antilogarithm of the activity of the dissolved $O^{2-}$ ions or $PO^{2-}$. The ordinates represent the potential in volts relatively to the reference oxygen electrode $O_1/O^{2-}$ at $pO^{2-}=0$; the abscissae represent the $pO^{2-}$ values.

In the case of a cell operating at a uniform $pO^{2-}$, the difference in output potential corresponding to BC or EF, for example, is very close to 1.10 v., and this thermodynamic potential corresponds to the oxidation of hydrogen by oxygen. In fact, when the cell commences to deliver a substantial current, the local $pO^{2-}$ values at the two electrodes vary and progress respectively towards A in the case of the combustible electrode ($H_2O/H_2$), curve 2, and towards D in the case of the oxidizing electrode ($O_2/O^{2-}$), curve 1, and the potential difference is thus finally brought back to approximately 0.6 v. corresponding to the difference in ordinate between the points B and F or B and G. The energy losses corresponding to the drop of 0.5 v. which in turn corresponds to GC are expended to no useful purpose as a result of a chemical reaction of acid-base neutralization within the electrolyte.

The common utilization of an injection of $CO_2$ at the oxygen electrode (curve 1) prevents this progression of the local $pO^{2-}$ (that is to say in the vicinity of this electrode $O_2/O^{2-}$) towards the point D and, on the contrary, brings it back to the vicinity of the point A. Consequently, the output potential difference is also brought back to BC, therefore to a value in the vicinity of 1.10 v.

The present invention has for its object a method which permits of a considerable improvement in the performances of a cell of this type which employs as electrolyte one or a number of fused carbonates. The invention also has for its object, by way of novel industrial products, the electrolytes for combustion cells which are obtained as a result of the application of said method.

The method according to this invention mainly consists in adding to the electrolyte, preferably at the outset, at least one compound which is either a strong base or which has suitable acid-base properties for the purpose of buffering the electrolyte to a uniform $pO^2$ value throughout its volume and in particular in the vicinity of the electrodes.

In this manner, the acidity potential of the electrodes in a carbonate cell is maintained at the same value by adding to the electrolyte the acid and the base of a same weak acid-base system, the addition being carried out in the fused alkali carbonates at the temperature at which the experiments are performed.

In one particular mode of operation, there is added to the electrolyte an alkali oxide which then makes it possible to maintain the hydrogen electrode at the alkaline end of the acidity range of the electrolyte in spite of the formations of acid species which take place at said electrode.

The method according to the invention offers an advantage over the known method of continuous injection of $CO_2$ in that it permits of greater simplicity of utilization and constructional design of the cell.

The injection of $CO_2$ during the operation made it necessary for the cell to operate in the $pO^{2-}$ region which is close to A (namely 6) whereas, by judiciously selecting our material, we can freely choose the $pO^{2-}$ which is to be employed for the operation of the cell.

The present invention therefore has substantially for its object a method whereby the performances of a combustion cell can be improved by eliminating the processes of polarization which are due to acidity transfer processes.

This method consists in incorporating with the electrolyte either strong-base compounds or a mixture of acid and base of a same weak system so as to fix the acidity potential of the electrolyte at a same value within the entire volume thereof.

Generally speaking, the dissolved compounds which fix the $pO^{2-}$ of the electrolyte must be maintained in a sufficiently large quantity within the electrolyte even if, as a result of the operation of the cell, said compounds are progressively consumed. This can be achieved by incorporation of alkali hydroxides or oxides or acid reagents and weak bases which are employed either by direct addition or by any other known method.

Figure 2:
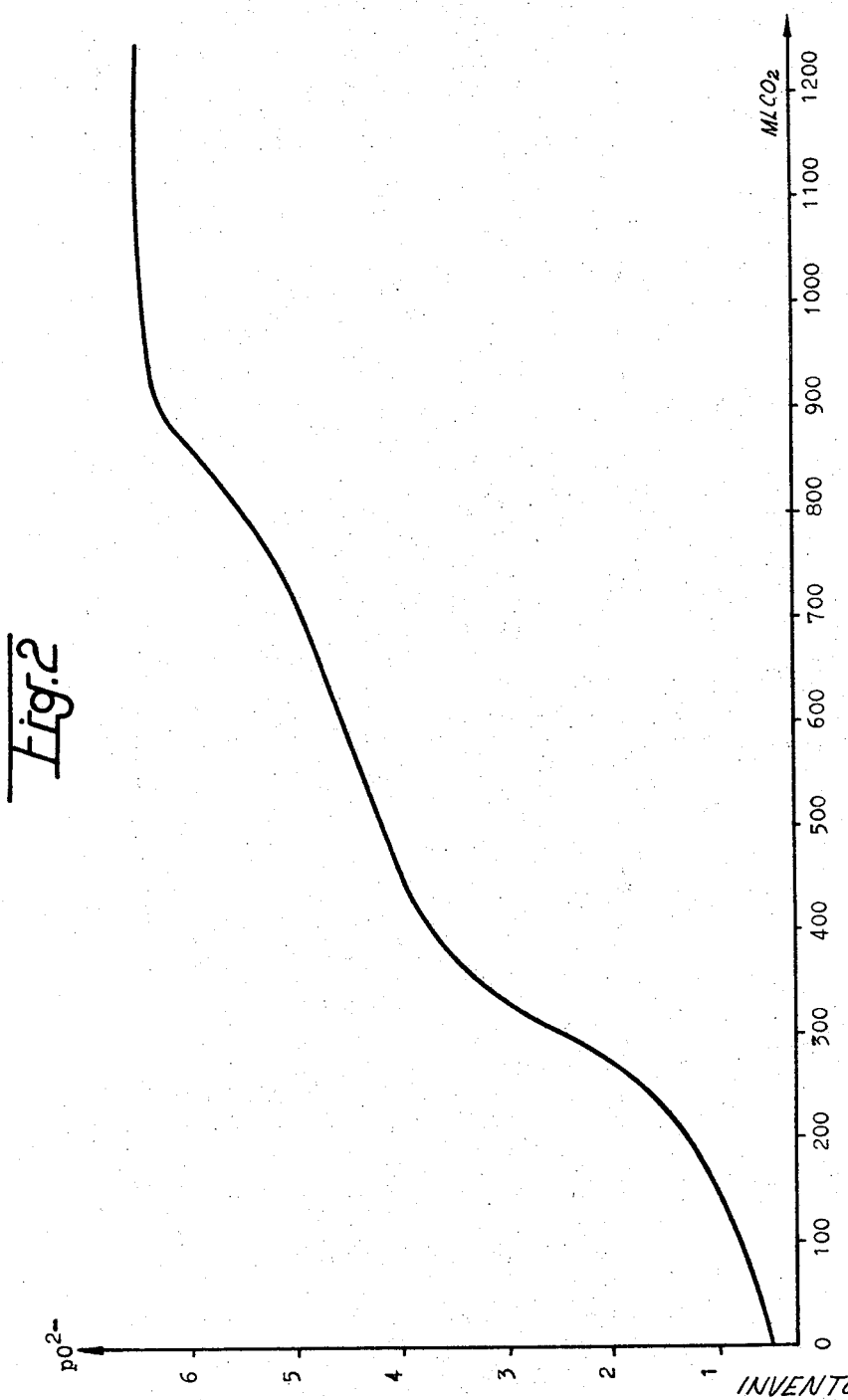
FIGURE 2 is a graph showing the curve of neutralization by $CO_2$ of a fused carbonate electrolyte.

FIGURE 2 shows the curve of neutralization by $CO_2$ of the ternary eutectic mixture of carbonates of lithium, sodium, potassium (which are present in the respective molar ratios of 1.75, 1.25 and 1) at 560° C. containing in solution, in addition with respect to the stoichiometric composition of the carbonates, a molar concentration of 0.25 of metasilicate $SiO_3^{2-}$ and a concentration, also molar, of 0.50 of oxide $O^{2-}$, these two last-mentioned products constituting an acid-base system as has been proposed earlier. The reaction of these two products results in an acid-base system of orthosilicate-metasilicate $SiO_4^{4-}/SiO_3^{3-}$ in the presence of a molar concentration of 0.25 of $O^{2-}$ ions in excess.

This neutralization curve shows three plateaux at which the respective compositions permit of a buffer effect in a fused carbonate cell.

In the first place, the saturation by carbon dioxide gas in one atmosphere makes it possible to maintain the acidity potential of the two electrodes at the strong acid end of the solvent, that is to say at a $pO^{2-}$ in the vicinity of 6. The existence of a buffer stage at this point corresponds to the well known method which consists in injecting carbon dioxide gas at the oxygen electrode, said gas being combined with the oxygen.

At the alkaline end of the acidity range, the fused carbonates, namely the carbonates which have low $pO^{2-}$ values, another stage or plateau can be observed; this stage corresponds to the neutralization by $CO_2$ of the high alkalinity which is associated with the presence of alkali oxide added in excess to the carbonates as noted above. It will therefore be possible by incorporation of alkali oxide in excess in a cell to maintain the $pO^{2-}$ of both electrodes at a given moment at a same value which corresponds to a $pO^{2-}$ in the vicinity of 0 to 1.

In the range of intermediate $pO^{2-}$ values in the vicinity of 4.5, the neutralization of the orthosilicate ions added as noted above to the metasilicate ions shows a weak acid-base buffer stage. It is therefore possible by adding the combination orthosilicate-metasilicate to the alkali carbonate electrolyte of a combustion cell to maintain both electrodes at the same time at a same $pO^{2-}$ value in the vicinity of 4.5 in spite of the additions of acid and basic species which are produced therein. As a consequence, if reference is made to FIGURE 1, the potential of the two electrodes remains in the vicinity of 1.10 v., provided that the $pO^{2-}$ value at both electrodes in fact remains the same.

The two cases which correspond respectively to the addition of alkali oxides and to the addition of weak acid-base combinations of orthosilicate-metasilicate represent examples of application of the general method set forth earlier which makes it possible to improve the performances of a combustion cell by maintaining the acidity potential of both electrodes at the same value. Moreover, if, in the course of time and as a result of the conditions of addition and removal of the initial and final reagents of the combustion process, the general composition of the electrolyte varies progressively, it is possible to restore said composition to the selected value by means of any external addition of acid or basic compounds, either directly or by any other known method.

Figure 3:
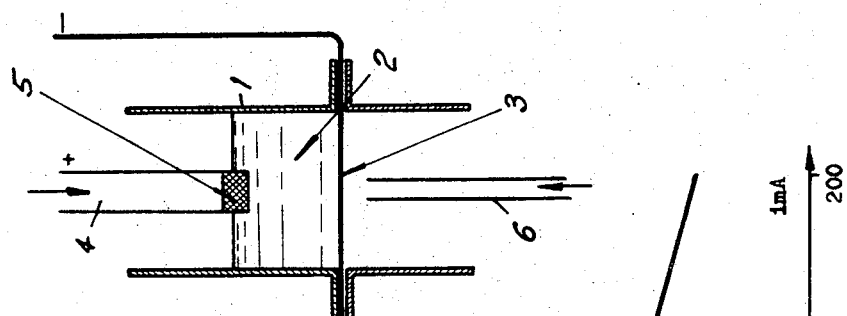
FIGURE 3 is a schematic view of a fuel cell.
Figure 4:
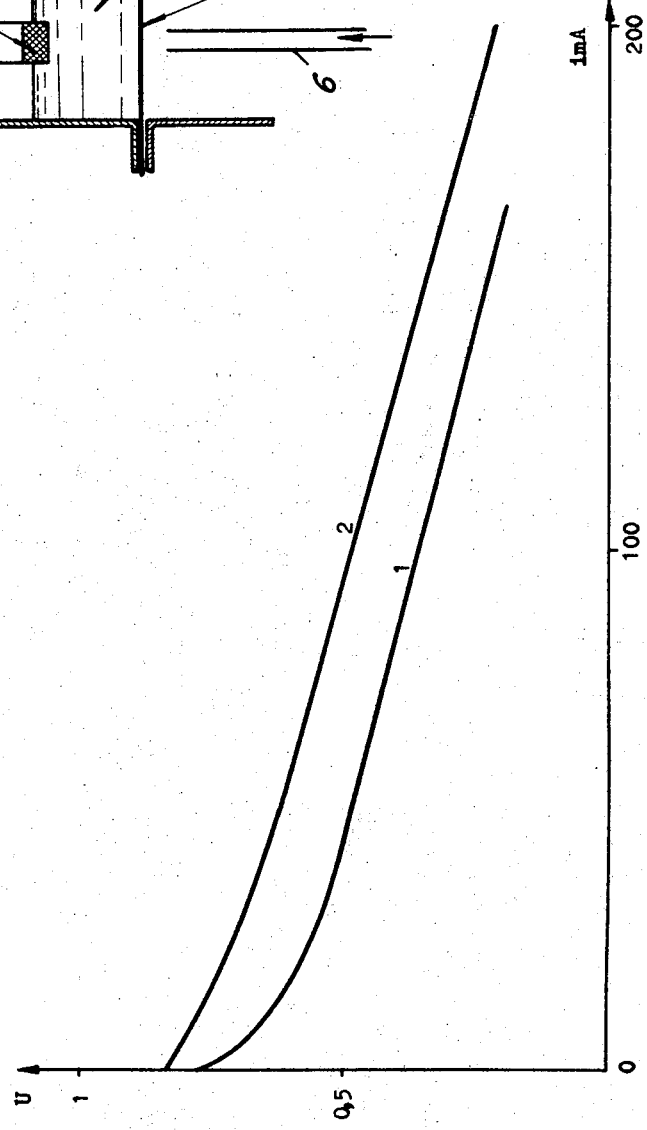
FIGURE 4 is a graph of the open circuit cell voltage vs. current for two electrolyte compositions.

By way of example which shows that the performances of a combusion cell are in fact improved by virtue of the primary effect of the additions which are proposed, wherein said effect corresponds to the establishment of acid-base buffer properties within the electrolyte, FIGURE 4 gives the charge curves recorded in the case of a cell containing a eutectic mixture of alkali carbonates which operates at 560° C. and supplied with hydrogen and oxygen as illustrated in FIGURE 3. In this cell, the vessel or container 1 contains the fused electrolyte 2; said vessel is closed by a sheet 3 of palladium. Air is admitted through the tube 4 which is closed by the sintered electrode 5; hydrogen is admitted at 6. The oxygen electrode of sintered silver has a front surface area of approximately 1 cm.² and limits the performances of the cell on account of its surface area. Curve 1 (shown in FIG. 4) shows the charge curve corresponding to the utilization of a carbonate medium without addition of constituents having acid-base properties. Said curve shows that, as soon as the currents are of a relatively low order, there exists a polarization which corresponds to a highly negative curvature of the potential/current relation. On the contrary, curve 2 (shown in FIGURE 4), which has been drawn after establishing the molar concentration of alkali oxides in the electrolyte, only shows a very slight curvature. Said curve clearly shows that, in the case of a potential difference of 500 mv., for example, the current delivery by the cell is doubled as a result of the addition of oxides.

According to another characteristic feature, there is conjointly added to the alkali hydroxides contemplated in the forms of embodiment given above a certain quantity of water which is either in solution in the electrolyte or which is introduced directly, for example, by injection of steam, whether alone or in combination with the combustion-supporting oxygen or air.

Experience shows that this addition in fact has the effect of maintaining the $pO^{2-}$ constant in the volume of electrolyte and in particular in the vicinity of the electrodes. In fact, the authors of this invention have been able to demonstrate the fact that the $O^{2-}$ exchanger system

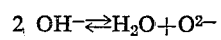

must be considered in the fused carbonates as a weak $O^{2-}$ ion exchanger (weak acid-base) as compared with the system of exchange of the same particle with the solvent.

The formation at the oxygen electrode of $O^{2-}$ ions increases when the current density increases. The acid $H_2O$ species of the exchanger combination $O^{2-},H_2O/OH$ must be added in a quantity which is larger as the current density is higher.

This alternative form of the method according to the present invention also has the effect of producing an entirely unexpected result in that it is no longer absolutely necessary to add hydroxide to the electrolyte since a sufficient quantity is formed as a result of the action of water added to the carbonates which form said electrolyte.

The curves of FIGURE 4 are again shown at 1 and 2 in FIGURE 5 for the sake of comparison and the reference numeral 3 designates a curve which represents the operation of a cell at the acid end of the $pO^{--}$ scale with addition of $CO_2$ in the oxygen and, finally, curve 4 shows the performances of the same cell with addition of water in the oxygen.

Curves 1 and 2 of FIGURE 5 (curves of FIGURE 4) compare the performances obtained in the case of a cell consisting of a eutectic mixture of carbonates at 560° C. which is supplied with hydrogen and oxygen (curve 1) and those of the same cell in which there has been effected an addition of hydroxide in the electrolyte (curve 2).

The improvement obtained is not perfect. In particular, the open-circuit cell voltage is in the vicinity of 0.8 v. whereas the thermodynamic value is in the vicinity of 1.1 v.

In the same figure, curve 4 represents the performances of the same cell as employed with addition of water in the oxygen (water pressure of 300 millibars, total pressure 1,200 millibars). It is observed that, under these conditions, the low-current polarization has practically disappeared and that the current densities delivered by the cell are considerably increased at equal potential.

Curve 3 of the same figure serves to compare these performances with those of a similar cell but which operates at the acid end of the $pO^{--}$ scale by introducing $CO_2$ in the oxygen. It can be seen that the addition of water to the combustion-supporting oxygen considerably increases the performances of the cell compared with the addition of $CO_2$.

What we claim is:

1. A method of operating a fuel cell using an electrolyte consisting of at least one fused alkali carbonate into which is placed a pair of electrodes and in which an oxidant is supplied to one electrode and a fuel is supplied to the other electrode, characterized by the improvement which comprises adding to the fused electrolyte from outside the fuel cell at the beginning of the operation thereof and distributing substantially uniformly throughout the electrolyte at least one member selected from the group consisting of (1) alkali oxides, (2) alkali hydroxides and (3) a mixture of an alkali oxide and a compound selected from the group consisting of weak acids and alkali salts of weak acids, maintaining a suitable concentration of said member in the electrolyte throughout the operation of the cell and mixing water vapor with the oxidant supplied to said one electrode so that during operation of the fuel cell water vapor is added to the fuel cell with the oxidant in order to minimize polarization by maintaining the acidity potential of the electrolyte substantially uniform throughout the entire volume thereof.

2. A method according to claim 1, in which the member consists essentially of a mixture of an alkali oxide and an alkali orthosilicate.

3. A method according to claim 1, in which the member consists essentially of a mixture of an alkali oxide, an alkali orthosilicate and an alkali metasilicate.

References Cited

UNITED STATES PATENTS

| | | | |
|---|---|---|---|
| 1,337,381 | 4/1920 | Alexander | 106—74 |
| 2,797,201 | 6/1957 | Veatch et al. | 106—40 |
| 3,099,587 | 7/1963 | Chambers et al. | 136—86 |
| 3,120,456 | 2/1964 | Broers | 136—153 X |

OTHER REFERENCES

Vail, Soluble Silicates in Industry, The Chemical Catalog Co., Inc., 1928, p. 372.

Young, Fuel Cells, Reinhold Publishing Corp., 1960, pp. 78–83.

Reinhold, Condensed Chemical Dictionary, sixth edition, 1961, p. 1053.

WINSTON A. DOUGLAS, *Primary Examiner.*

D. L. WALTON, *Assistant Examiner.*